(12) United States Patent
Tamura

(10) Patent No.: US 11,071,102 B2
(45) Date of Patent: *Jul. 20, 2021

(54) MOBILE COMMUNICATION SYSTEM, SGW, TERMINAL, RECEPTION METHOD OF MOBILE COMMUNICATION SYSTEM, RECEPTION METHOD OF SGW, AND RECEPTION METHOD OF TERMINAL

(71) Applicant: NEC CORPORATION, Tokyo (JP)

(72) Inventor: Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,695

(22) Filed: Feb. 20, 2020

(65) Prior Publication Data

US 2020/0196287 A1  Jun. 18, 2020

Related U.S. Application Data

(63) Continuation of application No. 15/535,254, filed as application No. PCT/JP2015/002292 on Apr. 30, 2015, now Pat. No. 10,609,694.

(30) Foreign Application Priority Data

Dec. 22, 2014  (JP) .................................. 2014-258414

(51) Int. Cl.
*H04W 72/04* (2009.01)
*H04W 36/12* (2009.01)
(Continued)

(52) U.S. Cl.
CPC ...... *H04W 72/042* (2013.01); *H04W 36/0011* (2013.01); *H04W 36/0022* (2013.01);
(Continued)

(58) Field of Classification Search
CPC .......... H04W 72/042; H04W 36/0011; H04W 36/0022; H04W 36/023; H04W 36/12; H04W 68/00; H04W 68/02; H04W 68/005
(Continued)

(56) References Cited

U.S. PATENT DOCUMENTS 9,247,528 B2 * 1/2016 Bhaskaran ........ H04W 56/0035
10,609,694 B2 * 3/2020 Tamura ............... H04W 36/023
(Continued)

FOREIGN PATENT DOCUMENTS

CN 101282511 A 10/2008
CN 102036377 A 4/2011
(Continued)

OTHER PUBLICATIONS

Kalyanasundaram et al; Signaling Reduction in Idle Mode for Inter-Technology Mobility; IEEE, 2007. (Year: 2007).*
(Continued)

*Primary Examiner* — Christopher R Crompton
(74) *Attorney, Agent, or Firm* — Sughrue Mion, PLLC

(57) ABSTRACT

The mobile communication system according to an exemplary embodiment of the present invention includes UE (45), MME (25), SGSN (27) and SGW (15). The SGW (15) includes means for, when ISR is active in the UE (45), the MME (25), the SGSN (27) and the SGW (15), sending a Downlink Data Notification message to the MME (25) and the SGSN (27), and when a Modify Bearer Request message is received from another MME (35) or another SGSN (37) different from the MME (25) and the SGSN (27), resending the Downlink Data Notification message only to another MME (35) or another SGSN (37) having sent the Modify Bearer Request message.

10 Claims, 12 Drawing Sheets

(51) Int. Cl.
H04W 68/00 (2009.01)
H04W 36/02 (2009.01)
H04W 36/00 (2009.01)
H04W 68/02 (2009.01)

(52) U.S. Cl.
CPC ......... *H04W 36/023* (2013.01); *H04W 36/12* (2013.01); *H04W 68/00* (2013.01); *H04W 68/02* (2013.01); *H04W 68/005* (2013.01)

(58) Field of Classification Search
USPC ...................................................... 370/329
See application file for complete search history.

(56) References Cited

U.S. PATENT DOCUMENTS

| | | | |
|---|---|---|---|
| 2010/0227621 | A1 | 9/2010 | Wu |
| 2010/0316000 | A1* | 12/2010 | Burbidge ............ H04W 68/02 370/328 |
| 2011/0077011 | A1 | 3/2011 | Wang et al. |
| 2011/0110350 | A1 | 5/2011 | Lu et al. |
| 2012/0202491 | A1 | 8/2012 | Fox et al. |
| 2012/0202496 | A1 | 8/2012 | Okabe et al. |
| 2013/0308527 | A1* | 11/2013 | Chin ................... H04W 64/003 370/328 |
| 2014/0016614 | A1* | 1/2014 | Velev .................. H04W 36/165 370/331 |
| 2014/0051443 | A1* | 2/2014 | Diachina ........... H04W 36/0022 455/436 |
| 2014/0105028 | A1 | 4/2014 | Bhaskaran et al. |
| 2014/0128110 | A1 | 5/2014 | Wang et al. |
| 2015/0087354 | A1* | 3/2015 | Ianev ................ H04W 36/0016 455/552.1 |
| 2015/0139054 | A1 | 5/2015 | Wu et al. |
| 2015/0181510 | A1* | 6/2015 | Gotou .................. H04W 60/00 455/434 |
| 2015/0201394 | A1* | 7/2015 | Qu ........................ H04W 4/021 455/456.1 |
| 2015/0223197 | A1* | 8/2015 | Kim ...................... H04W 76/11 455/458 |
| 2015/0237592 | A1 | 8/2015 | Kim et al. |
| 2015/0304987 | A1 | 10/2015 | Jin |
| 2016/0073308 | A1 | 3/2016 | Okabe et al. |
| 2016/0323845 | A1* | 11/2016 | Kim ...................... H04W 88/16 |
| 2018/0288735 | A1* | 10/2018 | Walldeen ................ H04W 4/70 |

FOREIGN PATENT DOCUMENTS

| | | |
|---|---|---|
| CN | 103458505 A | 12/2013 |
| CN | 103731918 A | 4/2014 |
| EP | 2 209 279 A1 | 7/2010 |
| JP | 2011-504029 A | 1/2011 |
| JP | 2013-507051 A | 2/2013 |
| JP | 2013-55497 A | 3/2013 |
| JP | 5606603 B1 | 10/2014 |
| KR | 10-1332971 A | 11/2013 |
| KR | 10-2014-0073870 A | 6/2014 |
| RU | 2013 125 759 A | 12/2014 |
| WO | 2014162375 A1 | 10/2014 |
| WO | 2014188673 A1 | 11/2014 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401 V12.0.0, Mar. 2013, pp. 1-290.

3GPP, "3rd Generation Partnership Project; Technical Specification Group Services and System Aspects; General Packet Radio Service (GPRD) enhancements for Evolved Universal Terrestrial Radio Access Network (E-UTRAN) access (Release 13)", 3GPP TS 23.401, V13.1.0, Dec. 2014.

Alcatel-Lucent, "Discussion on th © handling of dedicated bearer related procedures during handover (linked with LS C4-102383 from CT4)," 3GPP TSG SA WG2 Meeting #81, TD S2-104686, Prague, Czech Republic, Oct. 11-15, 2010, pp. 1-2.

Alcatel-Lucent, "Downlink user data buffering In IDLE state," 3GPP TSG SA WG2 Meeting #68, TDS2-086567, Qing Dao, China, Oct. 13-17, 2008, pp. 1-7.

Cisco, "Rejecting the dedicated bearer related procedure from MME to SGW and PGW," 3GPP TSG CT4 Meeting #50, C4-102306, Xi'an, P.R. China, Aug. 23-27, 2010, 5 pgs.

Communication dated Aug. 4, 2017 from the Russian Patent Office in counterpart Russian application No. 2015154723/07/(084406).

Communication dated Jan. 22, 2019, issued by the Japan Patent Office in corresponding Japanese Application No. 2016-114500.

Communication dated May 16, 2018 from the Korean Intellectual Property Office in counterpart Application No. 10-2018-7006873.

Communication of Japanese Application No. 2015-215646 dated Mar. 1, 2017.

Communication of Korean Patent Application No. 10-2015-7036021 dated Jun. 15, 2016.

Communication of Korean Patent Application No. 10-2016-7032989 dated Feb. 1, 2017.

Ericsson et al., "PGW and SGW Charging alignment in downlink," 3GPP TSG SA WG2 Meeting #99, S2-133838, Xiamen, P.R. China, Sep. 23-27, 2013, 5 pgs.

Huawei, "Periodic TA update," 3GPP TSG-SA2 Meeting #64bis, S2-083361, Munich, Germany, May 7-9, 2008, 3 pgs.

International Search Report of PCT/JP2015/002292, dated Jun. 2, 2015 (PCT/ISA/210).

Nokia Networks, KDDI, Verizon, Propagating the MME/S4-SGSN identity to the PGW, 3GPPP TSG-CT WG4#66bis C4-142072, Oct. 24, 2014.

Office Action dated Sep. 10, 2019 in Chinese Application No. 201580070153.6.

Third Generation Partnership Project (3GPP™) DRAFT Meeting Report v.0.0.2 for TSG CT WG4 meeting: 64bis, Dubrovnik, Croatia, Mar. 31, 2014-Apr. 4, 2014, 102 pgs.

Third Generation Partnership Project (3GPP™) DRAFT Meeting Report v0.0.1 for TSG CT WG4 meeting: 65, Phoenix, US, May 19, 2014-May 23, 2014, 96 pgs.

Vodafone, Paging Load Reduction, 3GPP TSG-SA WG2#106 S2-144274, Nov. 21 2014.

ZTE, "MT traffic in congestion when ISR is activated," 3GPP TSG SA WG2 Meeting #89, TDS2-120654, Vancouver, Canada, Feb. 6-10, 2012, pp. 1-4

* cited by examiner

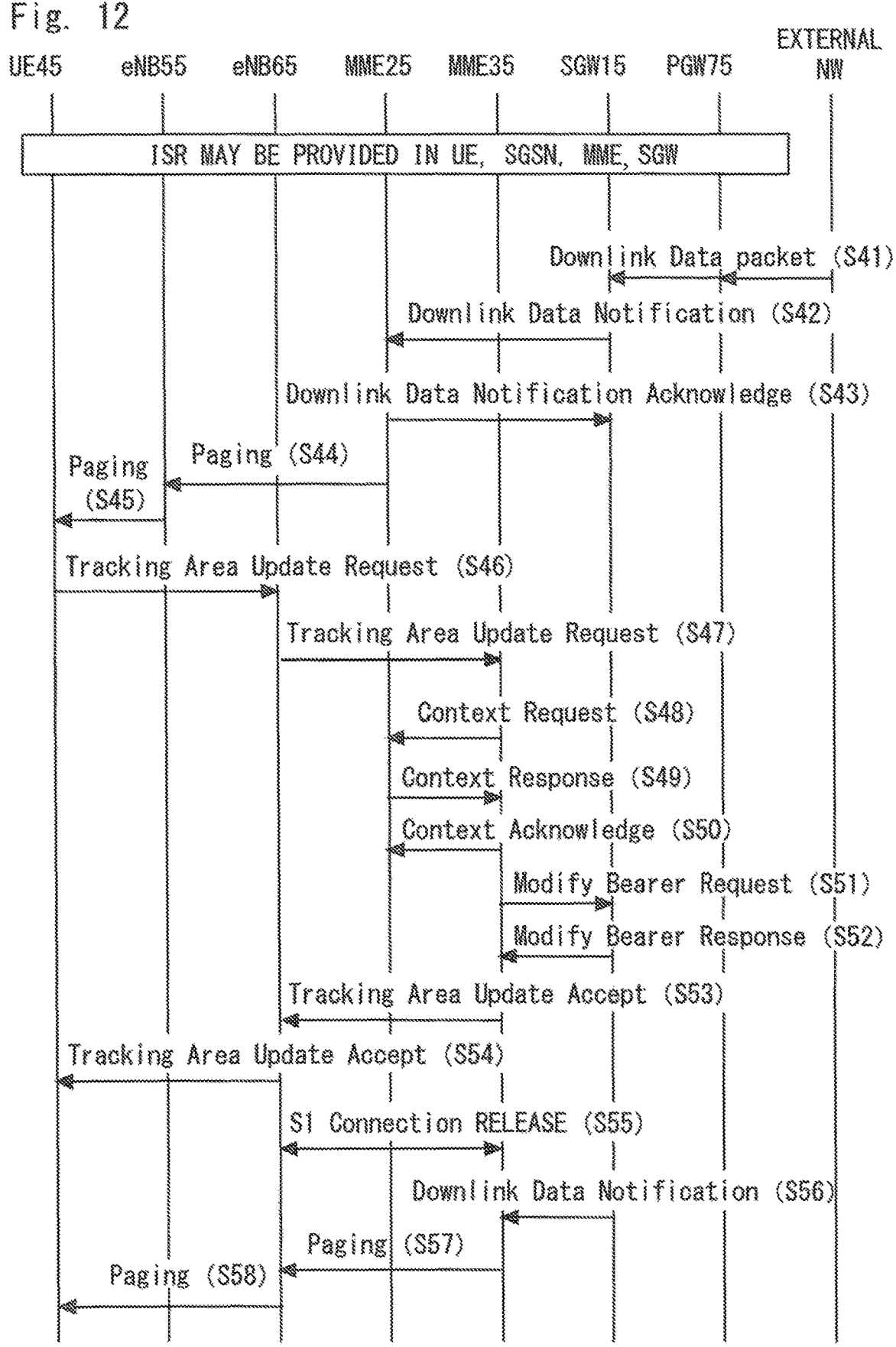

MOBILE COMMUNICATION SYSTEM, SGW, TERMINAL, RECEPTION METHOD OF MOBILE COMMUNICATION SYSTEM, RECEPTION METHOD OF SGW, AND RECEPTION METHOD OF TERMINAL

CROSS REFERENCE TO RELATED APPLICATIONS

This application is a continuation of U.S. application Ser. No. 15/535,254 filed on Jun. 12, 2017, which claims priority from National Stage of International Application No. PCT/JP2015/002292 filed Apr. 30, 2015, claiming priority based on Japanese Patent Application No. 2014-258414, filed Dec. 22, 2014, the entire disclosure of which is incorporated herein by reference.

TECHNICAL FIELD

The present invention relates to a mobile communication system, a terminal, and a reception method of a terminal and, for example, relates to a mobile communication system that implements ISR (Idle-mode Signaling Reduction), a terminal, and a reception method of a terminal.

BACKGROUND ART

In the 3GPP (Third Generation Partnership Project) that defines a standard for mobile network systems, EPC (Evolved Packet Core) is specified as the next generation mobile network system. The EPC is a network system that accommodates an LTE (Long Term Evolution) access network in addition to wireless access networks called the second generation and the third generation.

Downlink data packet processing in the EPC is described hereinafter. In Non-Patent Literature 1, the downlink data packet processing in the case where a UE (User Equipment) representing a user terminal is in the idle mode is disclosed. The state where the UE is in the idle mode is the state where the UE is not connected with the EPC. In other words, a wireless bearer between the LIE and the EPC is disconnected in this state. In such a case, when a downlink data packet is made to the UE, an SGW (Serving Gateway), which is a bearer management device, sends a downlink data notification message to an MME (Mobility Management Entity) or an SGSN (Serving GPRS Support Node) that manages the UE. Receiving the downlink data notification message, the MME or SGSN sends a Paging message to an eNB (evolved Node B) or a NodeB, which is a base station, in order to page the UE. Receiving the Paging message, the eNB or NodeB performs Paging processing on a plurality of UE located in the area managed by itself. The UE to be paged sends a response message to the eNB or NodeB and connects to the EPC.

In this manner, even when a downlink data packet is made to the UE in the idle mode which is not connected with the EPC, it is possible to perform data communication with the UE by paging the UE from the network side.

Further, when ISR is active, or activated in other words, in UE, SGSN, MME and S-GW, the S-GW sends a downlink data notification message to the MME and the SGSN. In this case; both of the MME and the SGSN perform Paging processing on the UE. Thus, when ISR is active, Paging processing is performed in both of the 2G/3G wireless access network and the LTE access network.

The state where ISR is active is the state where the UE is in ATTACH to the two devices, the SGSN and the MME, at the same time. Once ISR is active, mobility management of the UE is performed without sending TAU (Tracking Area Update) and RAU (Routing Area Update) from the UE even when the UE moves between the 2G/3G wireless access network and the LTE access network.

CITATION LIST

Patent Literature

NPL1: 3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.0.0 (2013-03), clauses 5.3.4.3, 5.3.3.2

SUMMARY OF INVENTION

Technical Problem

However, in the downlink data packet processing disclosed in the above literature, the following problem occurs. Normally, when the UE moves out of a location registration area managed by the MME, the UE sends a location registration request (Tracking Area Update Request) message to a new MME that manages a location registration area to which the UE is to move. Receiving the location registration request message, the new MME performs location registration of the UE. After the location registration in the new MME is done, the UE becomes the state Where it is registered in the new MME that manages the location registration area to which it is to move.

When a downlink data packet arrives to the UE after the UE sends the location registration request message and before processing for movement is done in the new MME, the S-GW sends the downlink data notification message to the old MME that has managed the location of the UE before movement. Receiving the downlink data notification message, the old MME sends a Paging message to a base station under its control; however, because the UE to be paged has moved out to the area managed by the new MME, it is not possible to page the UE. In other words, when a downlink data packet is made while the UE is during its movement which involves a change in the MME, the problem that the UE cannot receive the downlink data packet occurs.

An exemplary object of the present invention is to provide a mobile communication system, a terminal, and a downlink data processing method of a terminal that perform control so as to reliably receive a downlink data packet that is made during movement of the mobile terminal device.

Solution to Problem

A mobile communication system according to a first exemplary aspect of the present invention is a mobile communication system including a terminal (UE), MME (Mobility Management Entity), SGSN (Serving CPRS Support Node) and SGW (Serving Gateway), and in a case where ISR (Idle-mode Signaling Reduction) is active in the terminal, the MME and the SGSN, the SGW includes means for sending a Downlink Data Notification message to the MME and the SGSN, and when receiving a Modify Bearer Request message from one of another MME and another SGSN different from the MME and the SGSN, resending the Downlink Data Notification message only to said one of another MME and another SGSN having sent the Modify Bearer Request message.

A terminal according to a second exemplary aspect of the present invention is a terminal (UE) used in a mobile communication system, including receiving means for receiving paging from a base station in a case where ISR is active in the terminal and the terminal is registered in MME (Mobility Management Entity) and SGSN (Serving GPRS Support Node) as a result that, when the MME is changed, after an old MME before change and the SGSN receive a Downlink Data Notification (DDN) message to the terminal, if only a new MME after change receives the Downlink Data Notification message that is resent, a paging message resulting from the Downlink Data Notification message is sent from the new MME to the base station.

An downlink data processing method of a terminal according to a third exemplary aspect of the present invention is an downlink data processing method of a terminal (UE) used in a mobile communication system where, in a case where where ISR is active in the terminal and the terminal is registered in MME (Mobility Management Entity) and SGSN (Serving GPRS Support Node), when the MME is changed, after an old MME before change and the SGSN receive a Downlink Data Notification (DDN) message to the terminal, if only a new MME after change receives the Downlink Data Notification message that is resent, a paging message resulting from the Downlink Data Notification message is sent from the new MME to a base station, and paging is received from the base station.

Advantageous Effects of Invention

According to the exemplary aspects of the present invention, it is possible to provide a mobile communication system, a terminal, and an downlink data processing method of a terminal that perform control so as to reliably receive a downlink data packet that is made during movement of the mobile terminal device.

BRIEF DESCRIPTION OF DRAWINGS

FIG. 12 is a diagram showing a flow of processing when a downlink data packet is made to UE according to a third exemplary embodiment.

DESCRIPTION OF EMBODIMENTS

First Exemplary Embodiment

Figure 1:
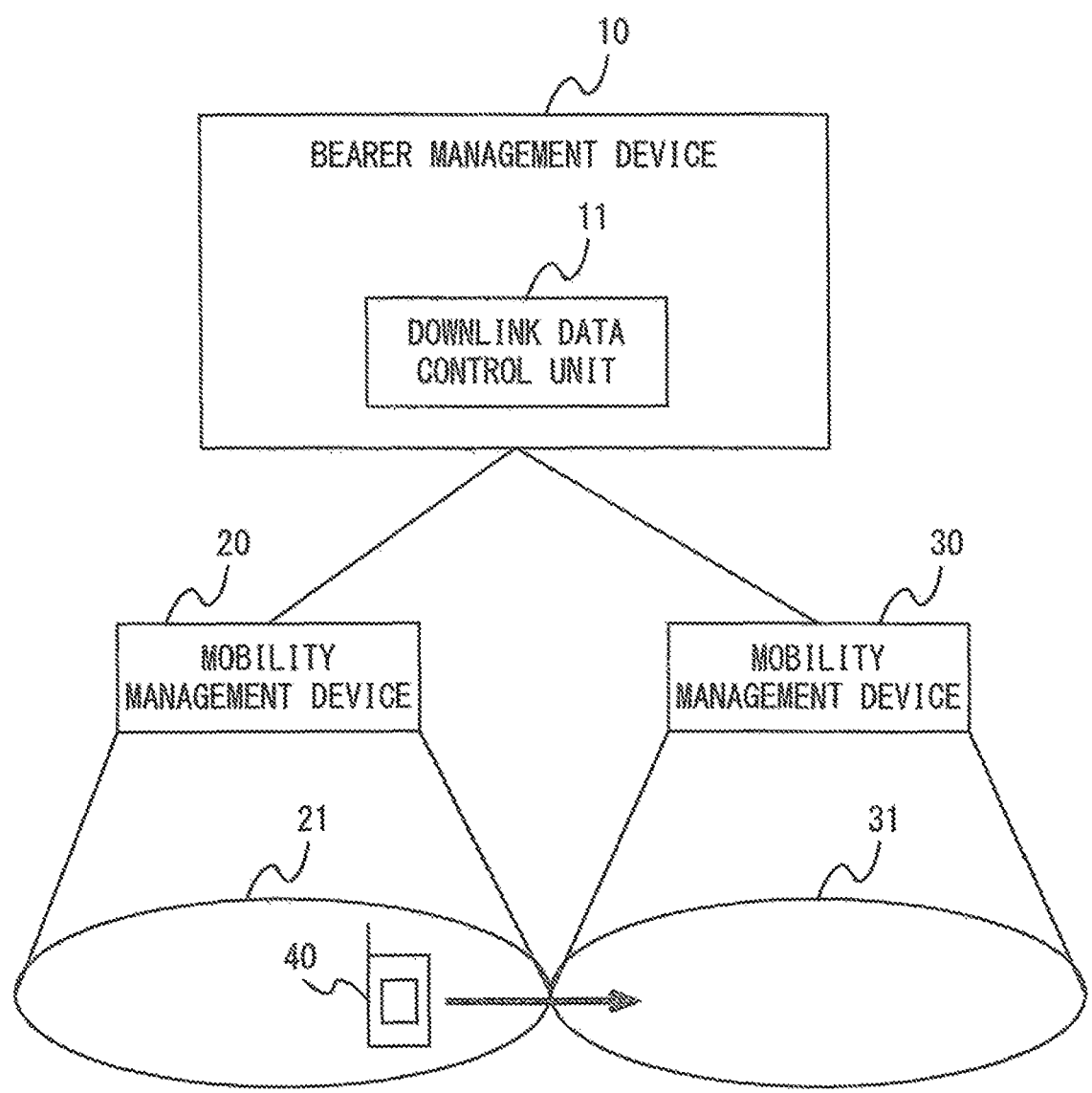
FIG. 1 is a configuration diagram of a communication system according to a first exemplary embodiment.

An exemplary embodiment of the present invention is described hereinafter with reference to the drawings. A configuration example of a communication system according to a first exemplary embodiment is described hereinafter with reference to FIG. 1. The communication system in FIG. 1 includes a bearer management device 10, a mobility management device 20, a mobility management device 30, and a mobile terminal device 40. The mobility management device 20 manages the location of the mobile terminal device located in a location registration area 21. The mobility management device 30 manages the location of the mobile terminal device located in a location registration area 31. Further, in FIG. 1, the mobile terminal device 40 is moving from the location registration area 21 to the location registration area 31. Note that, in FIG. 1, a wireless base station that wirelessly communicates with the mobile terminal device 40 is not shown. As the mobile terminal device 40 moves from the location registration area 21 to the location registration area 31, the mobility management device that manages the mobile terminal device 40 changes from the mobility management device 20 to the mobility management device 30. When registration of the mobile terminal device 40 is completed, the mobility management device 30 notifies the bearer management device 10 about the completion of movement of the mobile terminal device 40.

A configuration example of the bearer management device 10 is described hereinafter. The bearer management device 10 includes a downlink data control unit 11. The case Where a downlink data packet is made to the mobile terminal device 40 when the mobile terminal device 40 has moved from the location registration area 21 to the location registration area 31 and before registration of the mobile terminal device 40 is completed in the mobility management device 30 is described hereinafter. In this case, even when a downlink data is made to the mobile terminal device 40, the downlink data control unit 11 suspends downlink data processing for the mobile terminal device 40 until it receives a notification about the completion of movement of the mobile terminal device 40 from the mobility management device 30. After receiving a notification about the completion of movement of the mobile terminal device 40 from the mobility management device 30, the downlink data control unit 11 resumes downlink data processing for the mobile terminal device 40. For example, the downlink data control unit 11 may acquire information that the mobile terminal device 40 is during its movement from the mobility management device 20 when performing downlink data processing for the mobility management device 20.

The downlink data processing is processing that notifies an downlink data message to the mobility management device that manages the mobile terminal device 40, and sends data addressed to the mobile terminal device 40 to the mobile terminal device 40, for example. Suspending the downlink data processing may means that, when the downlink data control unit 11 detects that the mobile terminal device 40 is moving, it suspends transition to processing of sending data (user data) addressed to the mobile terminal device 40 to the mobile terminal device 40 and, after receiving a notification about the completion of movement of the mobile terminal device 40, sends the data addressed to the mobile terminal device 40 to the mobile terminal device 40. Alternatively, it may mean that the downlink data control unit 11 suspends transmission of a downlink data message to the mobility management device until it receives a notification about the completion of movement of the mobile terminal device 40 from the mobility management device 30. During movement of the mobile terminal device 40 may be a period from when the mobile terminal device 40 sends a location registration request message to the mobility management device 30 that manages the location registration area 31 to which it is to move to when the mobility management device 30 notifies a message indicating the completion of movement of the mobile terminal device 40 to the bearer management device 10.

Suspending the downlink data processing may be temporarily suspending the downlink data processing, temporarily stopping the downlink data processing, ceasing the downlink data processing with the assumption of resuming the downlink data processing, deferring the execution of the downlink data processing and the like.

As described above, with use of the communication system in FIG. 1, even when a downlink data packet is made to the mobile terminal device 40 while the mobile terminal device 40 is during its movement which involves a change in the mobility management device that manages its location, the mobile terminal device 40 can receive the packet communication. In other words, the bearer management device 10 can resume the downlink data processing for the mobile terminal device 40 after receiving a notification about the completion of movement from the mobility management device 30 that manages the location registration area to which the mobile terminal device 40 moves. Therefore, even when a downlink data packet is made before processing for movement of the mobile terminal device 40 is not done, the bearer management device 10 can notify the mobile terminal device 40 about a downlink data packet.

Second Exemplary Embodiment

Figure 2:
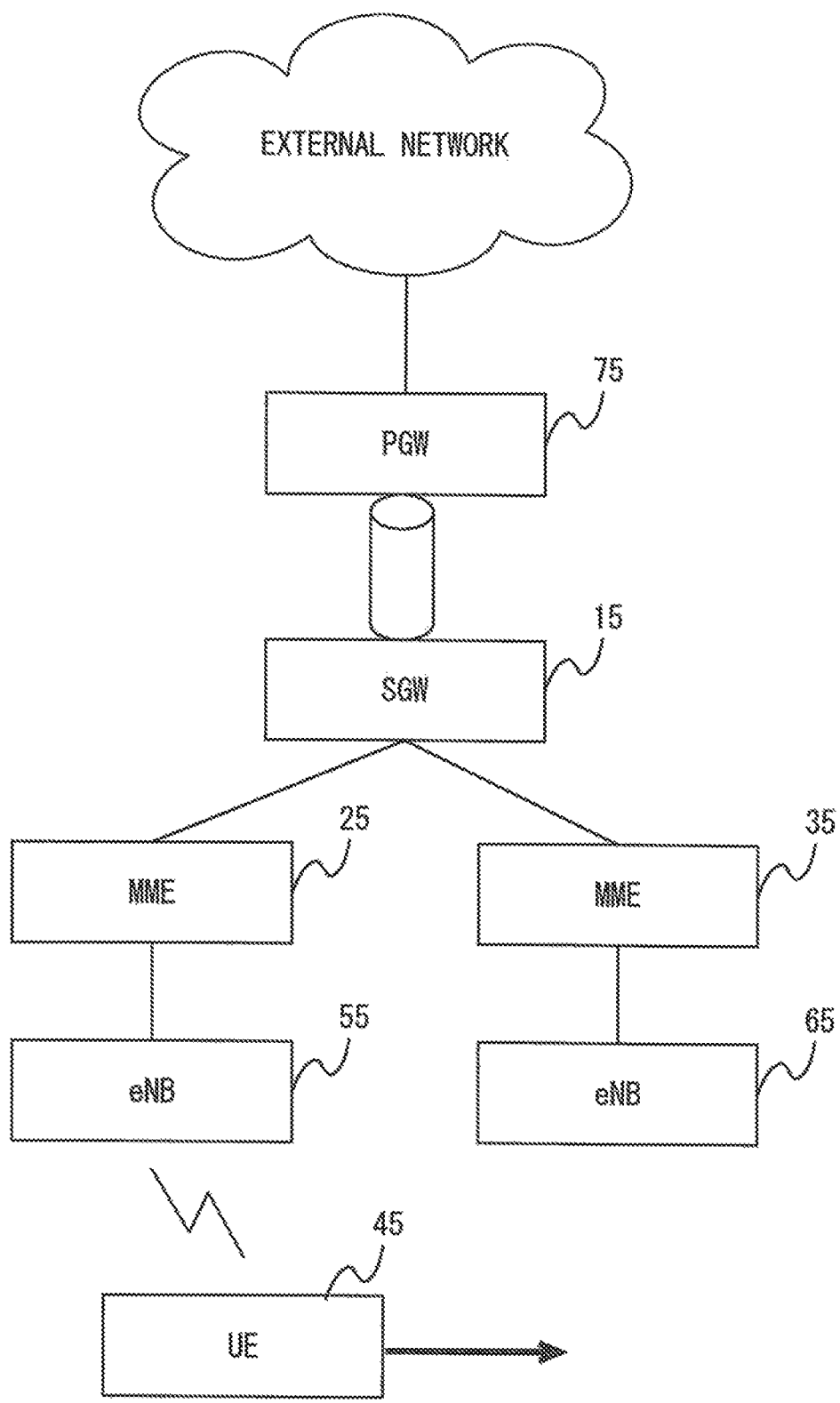
FIG. 2 is a configuration diagram of a mobile communication system specified in the 3GPP according to a second exemplary embodiment.

A configuration example of a communication system according to a second exemplary embodiment of the invention is described hereinafter with reference to FIG. 2. In FIG. 2, a mobile communication system specified in the 3GPP is described as a communication system. The communication system in FIG. 2 includes PGW (Packet Data Network GateWay) 75, SGW (Serving GateWay) 15, MME 25, MME 35, UE 45, eNB 55 and eNB 65.

The UE 45 is a communication device that is specified as a mobile terminal device in the 3GPP. The UE 45 may be a cellular phone, a smartphone, a tablet terminal, a personal computer with a communication function or the like, for example. Further, the UE 45 may be an M2M (Machine To Machine) device that performs communications in an autonomous manner. The M2M device may be a device that does not often move such as an automatic vending machine or an electrical appliance having a communication function, or a watch worn by a user and the like, for example.

The eNB 55 and eNB 65 are node devices specified as base stations in the 3GPP. Each of the eNB 55 and eNB 65 forms a wireless communication area and communicates with the UE that is located in the wireless communication area managed by itself.

The PGW 75 is a node device that is located at the boundary between the mobile communication system and the external network. The PGW 75 sends data sent from the external network to the node device in the mobile communication system. The PGW 75 establishes a communication bearer with the SGW 15. The communication bearer may be referred to as a communication channel, a communication path or the like, for example. The PGW 75 sends data sent from the external network to the SGW 15 through the communication bearer.

The bearer management device 10 in FIG. 1 is specified as the SGW 15 in the 3GPP. When the SGW 15 receives a notification about a downlink data packet to the UE 45, it notifies a downlink data message to the MME 25 or MME 35. Further, the SGW 15 sends data addressed to the UE 45 to the eNB 55 or eNB 65 that communicates with the mobile terminal device 45.

The mobility management devices 20 and 30 in FIG. 1 are specified as the MME 25 and MME 35 in the 3GPP. Each of the MME 25 and MATE 35 defines a location registration area that manages the location of the UE. In the location registration area managed by each of the MME 25 and MME 35, a plurality of eNB may be located. In other words, the location registration area may include a plurality of wireless communication areas formed by eNB.

When the UE 45 moves from the location registration area defined by the MME 25 to the location registration area defined by the MME 35, the UE 45 sends a location registration request message to the MME 35. Receiving the location registration request message sent from the UE 45, the MME 35 performs processing for movement of the UE 45. The processing for movement of the UE 45 is processing that the MME 35 registers the UE 45 as a device to be managed, for example. Further, when the MME 35 receives the location registration request message sent from the UE 45, it sends a message notifying that the UE 45 has moved to the location registration area defined by the MME 35 to the MME 25 that manages the location registration area from which the UE 45 moves. The UE 45 may add an identifier of the MME 25 that manages the location registration area before movement to the location registration request message for the MME 35. The MME 35 can thereby detect the MME 25 that manages the location registration area from which the UE 45 moves. The MME 25 receives the notification message from the MME 35 and can thereby detect that the UE 45 has moved to the location registration area defined by the MME 35.

After the processing for movement of the UE 45 is completed, the MME 35 sends a message indicating the completion of movement processing of the UE 45 to the SGW 15. In the case where a downlink data packet is made to the UE 45, the SGW 15 sends a downlink data notification message to the MME 25 until a message indicating the completion of movement processing of the UE 45 is sent from the MME 35.

There is a case where the MME 25 receives a downlink data notification message to the UE 45 from the SGW 15 after it receives a message indicating the movement of the UE 45 from the MME 35. In such a case, the MME 25 sends a message notifying that the UE 45 has moved out to the SGW 15.

By receiving the message notifying that the UE 45 has moved out from the MME 25, the SGW 15 detects that the UE 45 is during its movement which involves a change in the MME. When the SGW 15 detects that the UE 45 is during its movement which involves a change in the MME, the SGW 15 temporarily stores data addressed to the UE 45 into a buffer. When the SGW 15 receives a message notifying the completion of movement of the UE 45 from the MME 35, the SGW 15 sends a downlink data notification message to the UE 45 to the MME 35. After that, the SGW 15 sends the data addressed to the UE 45 to the UE 45.

Figure 3:
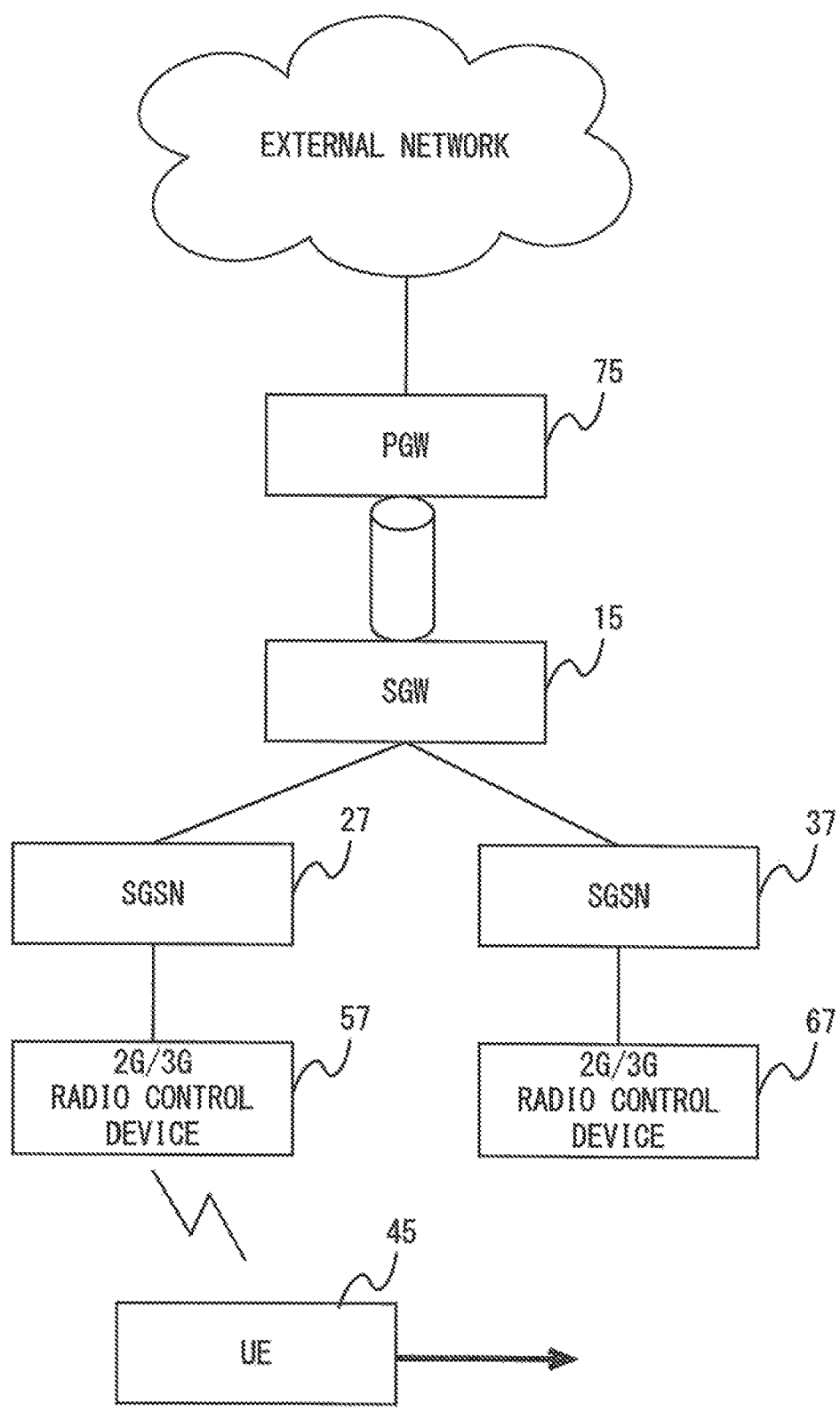
FIG. 3 is a configuration diagram of a mobile communication system specified in the 3GPP according to the second exemplary embodiment.

Although the mobility management devices 20 and 30 are described as being the MME 25 and 35 above, the mobility management devices 20 and 30 may be SGSN 27 and 37 as shown in FIG. 3, The SGSN 27 and 37 are node devices that manage the location of the UE that communicates with a wireless access network called 2G or 3G. The SGSN 27 and 37 connect to 2G/3G wireless control devices 57 and 67 in the wireless access network called 2G or 3G in the 3GPP. The 2G/3G wireless control device in the wireless access network called 2G or 3G may be called RNC (Radio Network Controller), for example. The configuration shown in FIG. 3 is the same as that of FIG. 2 except that the MME 25 and 35 are replaced with the SGSN 27 and 37, and the eNB 55 and 65 are replaced with the 2G/3G wireless control devices 57 and 67.

Figure 4:
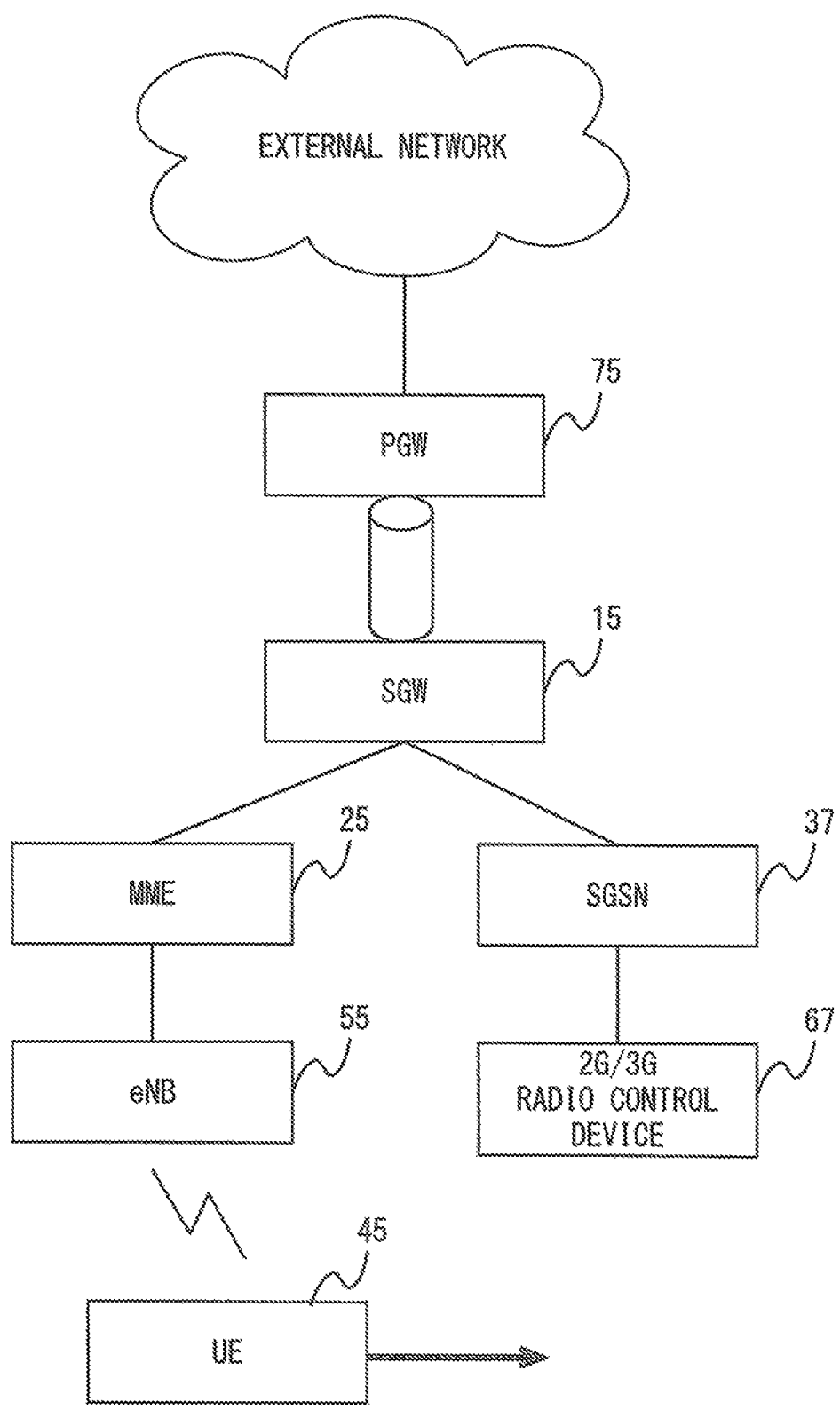
FIG. 4 is a configuration diagram of a mobile communication system specified in the 3GPP according to the second exemplary embodiment.
Figure 5:
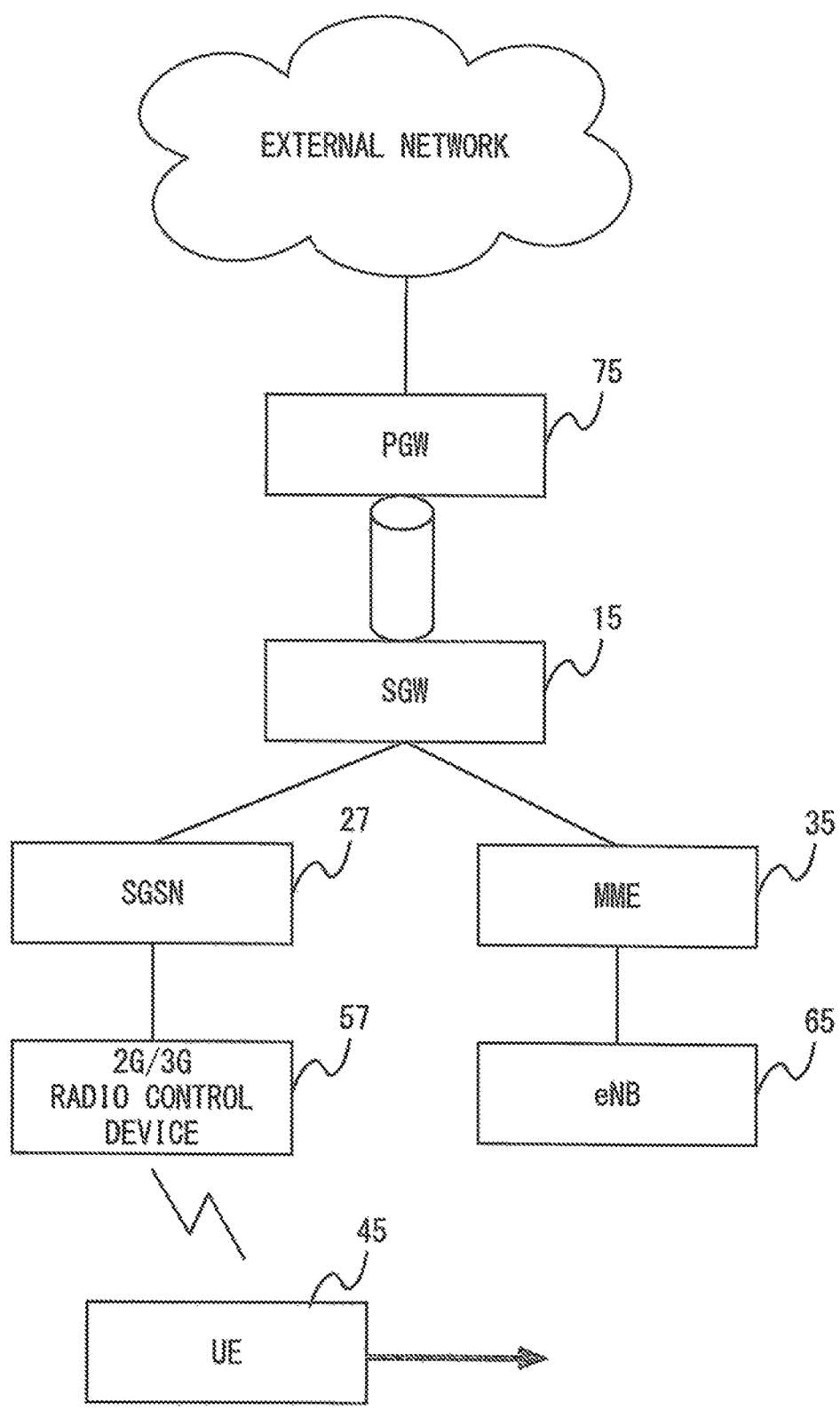
FIG. 5 is a configuration diagram of a mobile communication system specified in the 3GPP according to the second exemplary embodiment.

Further, the SGW 15 may connect to the MME 25 and the SGSN 37 as shown in FIG. 4. In other words, the SGW 15 may be located in the system where the MME and the SGSN coexist. The configuration shown in FIG. 4 is the same as that of FIG. 2 except that the MME 35 in FIG. 2 is replaced with the SGSN 37, and the eNB 65 is replaced with the 2G/3G wireless control device 67. FIG. 4 shows the way that the LIE 45 moves from the location registration area defined by the MME 25 to the location registration area defined by the SGSN 37. Further, in the case where the UE 45 moves from the location registration area defined by the SGSN 27 to the location registration area defined by the MME 35 as shown in FIG. 5 as well, the operation is the same as shown in FIG. 2.

The case where ISR is active in the UE 45, the MME 25, the SGSN 37 and the SGW 15 and further the SGSN 37 has completed the location registration of the UE 45, which is, where the SGSN 37 has completed the processing to register the UE 45 as a device to be managed, is described with reference to FIG. 4. In such a case, even when the UE 45 moves to the location registration area defined by the SGSN 37, the UE 45 does not send the location registration request message to the SGSN 37. The location registration request message may be a Routing Area Update Request message, for example.

Next, the case where ISR is active in the UE 45, the SGSN 27, the MME 35 and the SGW 15 and further the MME 35 has completed the location registration of the UE 45 is described with reference to FIG. 5. In such a case, even when the UE 45 moves to the location registration area defined by the MME 35, the UE 45 does not send the location registration request message to the MME 35. The location registration request message may be a Tracking Area Update Request message, for example.

Figure 6:
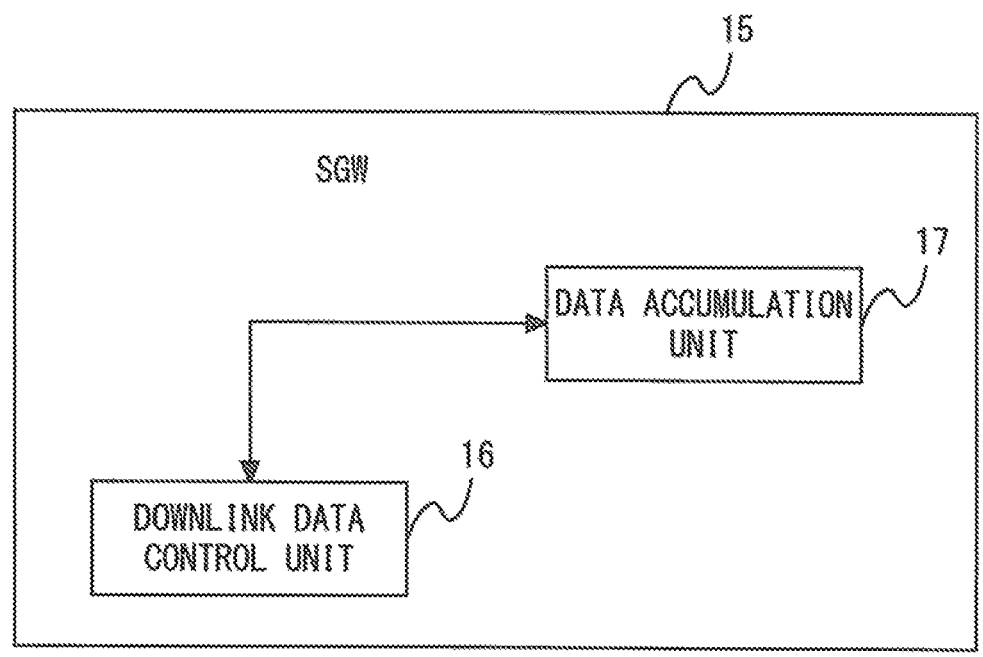
FIG. 6 is a configuration diagram of SGW according to the second exemplary embodiment.

A configuration example of the SGW 15 according to the second exemplary, embodiment of the invention is described hereinafter with reference to FIG. 6. The SGW 15 includes a downlink data control unit 16 and a data accumulation unit 17. The downlink data control unit 16 is the same as the downlink data control unit 11 in FIG. 1.

When a message notifying the movement of the UE 45 is sent from the MME 25 that manages the location registration area from which the UE 45 moves, the downlink data control unit 16 temporarily stores data addressed to the UE 45 into the data accumulation unit 17. Further, when a message notifying the completion of movement of the UE 45 is sent from the MME 35 that manages the location registration area to which the UE 45 moves, the downlink data control unit 16 sends a downlink data message to the UE 45 to the MME 35. Further, when a wireless bearer is established between the UE 45 and the eNB 65, the downlink data control unit 16 sends the data stored in the data accumulation unit 17 to the UE 45 through the eNB 65.

Further, the downlink data control unit 16 supports the processing operation in the case where the UE, the MME, the SGSN and the SGW implement ISR. For example, when the UE, the MME, the SGSN and the SGW implement ISR, the downlink data control unit 16 sends a downlink data message to both of the MME and the SGSN where the UE is registered.

Figure 7:
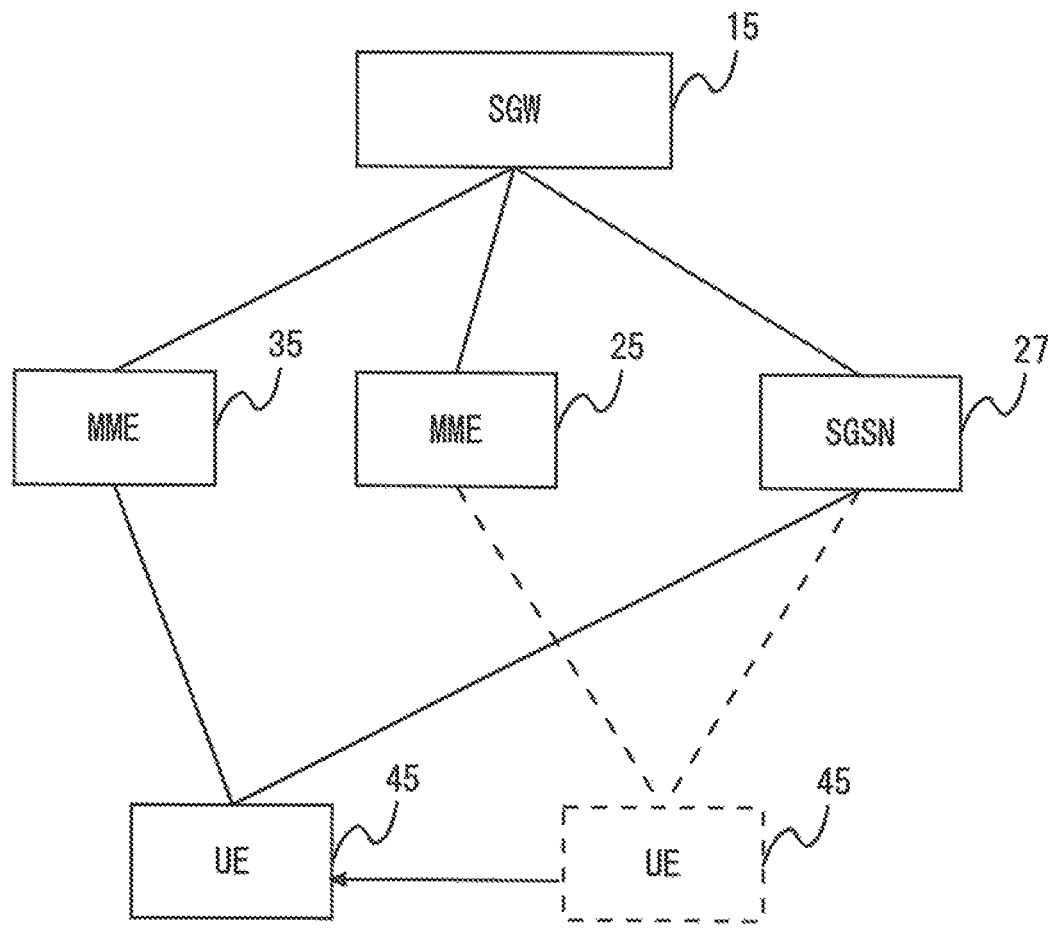
FIG. 7 is a view illustrating an operation when ISR is active according to the second exemplary embodiment.

A configuration example of a communication system according to the second exemplary embodiment of the invention is described hereinafter with reference to FIG. 7. The communication system of FIG. 7 includes SGW 15, MME 25, MME 35, SGSN 27 and UE 45. It is assumed that ISR is active in the MME 25, the SGSN 27 and the UE 45 before movement of the UE 45. Further, FIG. 7 shows that, with the movement of the UE 45, the MME that manages the UE 45 is changed from the MME 25 to the MME 35. The SGSN 27 that manages the UE 45 is not changed. It is also assumed that ISR is active in the MME 35, the SGSN 27 and the UE 45 after the movement of the UE 45 as well.

In the case before the movement of the UE 45 and where ISR is active, the SGW 15 sends a Downlink Data Notification message to the MME 25 and the SGSN 27 when an downlink data is made to the UE 45. Then, if the SGW 15 receives a Modify Bearer Request message from the MME 35, which is different from the MME 25, the SGW 15 resends the Downlink Data Notification message only to the MME 35.

As a result that the SGW 15 sends the Downlink Data Notification message only to the MME 35, it is possible to avoid the Paging processing in the SGSN 27.

Further, although the case where the MME that manages the UE 45 is changed from the MME 25 to the MME 35 is described as an example in FIG. 7, the same operation as in the case where the MME is changed from the MME 25 to the MME 35 applies also to the case where the SGSN that manages the UE 45 is changed. In this case also, the changed SGSN sends a Modify Bearer Request message to the SGW 15, and thereby the SGW 15 resends a Downlink Data. Notification message only to the changed SGSN. It is thus possible to avoid the Paging processing in the MME 25.

Figure 8:
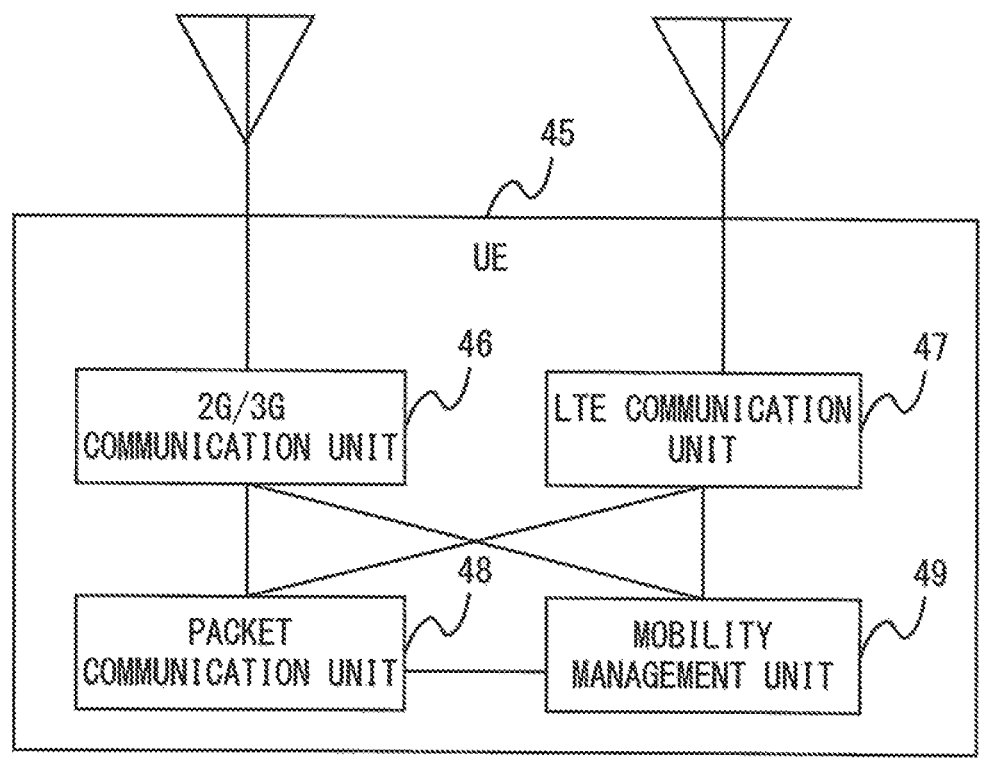
FIG. 8 is a configuration diagram of UE according to the second exemplary embodiment.

A configuration example of the UE 45 according to the second exemplary embodiment of the invention is described hereinafter with reference to FIG. 8. The UE 45 includes a 2G/3G communication unit 46, an LTE communication unit 47, a packet communication unit 48, and a mobility management unit 49.

The 2G/3G communication unit 46 receives a signal for paging from the 2G/3G wireless control device. Specifically, the 2G/3G communication unit 46 performs processing for paging that is performed in the 2G/3G wireless control device. In other words, when paged from the 2G/3G wireless control device, the 2G/3G communication unit 46 performs processing for paging. Further, upon change of the SGSN that manages the UE 45, the 2G/3G communication unit 46 starts Routing Area Update procedure. To be specific, the 2G/3G communication unit 46 sends a Routing Area Update message to the 2G/3G wireless control device.

The LTE communication unit 47 receives a signal for paging from the eNB. Specifically, the LTE communication unit 47 performs processing for paging that is performed in the eNB. In other words, when paged from the eNB, the LTE communication unit 47 performs processing for paging. Further, upon change of the MME that manages the UE 45, the LIE communication unit 47 starts Tracking Area Update procedure. To be specific, the LTE communication unit 47 sends a Tracking Area Update message to the eNB.

The packet communication unit 48 generates packet data through the 2G/3G communication unit 46 or the LTE communication unit 47. Alternatively, the packet communication unit 48 performs receiving processing of packet data received through the 2G/3G communication unit 46 or the LTE communication unit 47.

The mobility management unit 49 performs mobility management of the UE 45. For example, the mobility management unit 49 manages the current Tracking Area or Routing Area. When Tracking Area or Routing Area of the UE 45 is changed, the mobility management unit 49 instructs the 2G/3G communication unit 46 or the LTE communication unit 47 to start Routing Area Update procedure or Tracking Area Update procedure.

Hereinafter, a flow of processing to connect the UE to the mobile communication system according to the second exemplary embodiment of the invention is described with reference to FIG. 9. First, when a power switch is pressed by a user and a power is turned on, the UE 45 sends an Attach Request message as the location registration request message to the eNB 55 (S11). Next, the eNB 55 sends the Attach Request message sent from the UE 45 to the MME 25 (S12). Receiving the Attach Request message, the MME 25 generates location registration information of the UE 45. The location registration information contains information indicating that the UE 45 is located within the location registration area managed by its own device or subscriber information of the UE 45, for example. The subscriber information of the UE 45 may be acquired from a subscriber information management device (not shown) that is placed in the mobile communication system. The subscriber information management device is specified as HSS (Home Subscriber Server) in the 3GPP, for example. Then, the MME 25 notifies the subscriber information of the UE 45 to the SGW 15 using a Create Session Request message (S13). Then, the SGW 15 sends a Create Session Response message to the MME 25 as a response message to the Create Session Request message (S14). By receiving the Create Session Request message, the SGW 15 can identify the MME that manages the location of the UE 45. Further, by the transmission of the Create Session Response message, a session for the UE 45 is established between the MME 25 and the SGW 15.

Receiving the Create Session Response message, the MME 25 sends an Attach Accept message to the eNB 55 as a response signal to the Attach Request message (S15). By the transmission of the Attach Accept message, the MME 25 completes registration processing of the UE 45. The completion of registration processing of the UE 45 means the completion of movement processing of the UE 45. After that, the eNB 55 sends an Attach Accept message to the UE 45 (S16).

By receiving the Attach Accept message, the UE 45 becomes connected to the mobile communication system. The state where the UE 45 is connected to the mobile communication system may be referred to as the state where the UE 45 is attached to the mobile communication system.

Although the flow of processing when the power of the UE 45 is turned on is described above, the same processing is executed also when the location registration area where the UE 45 is located changes in order to generate location registration information in a new MME. When the location registration area Where the UE 45 is located changes, the UE 45 sends a Tracking Area Update Request message instead of the Attach Request message. Further, the MME 25 and the SGW 15 send and receive Modify Bearer Request/Modify Bearer Response messages instead of the Create Session Request/Create Session Response messages.

Hereinafter, a flow of processing to connect the UE to the mobile communication system according to the second exemplary embodiment of the invention is described with reference to FIG. 10. In FIG. 10, the eNB 55 and the eNB 65 in FIG. 9 are replaced with the 2G/3G wireless control device 57 and the 2G/3G wireless control device 67, respectively. Further, in FIG. 10, the MME 25 and the MME 35 in FIG. 9 are replaced with the SGSN 27 and the SGSN 37, respectively. Steps S101 to S106 in FIG. 10 are the same as Steps S11 to S16 in FIG. 9, and therefore detailed explanation thereof is omitted.

Hereinafter, a flow of processing performed when a downlink data packet is made to the UE 45 while the UE 45 is during its movement which involves a change in the MME according to the second exemplary embodiment of the invention is described with reference to FIG. 11. In this example, it is assumed that the processing of FIGS. 9 and 10 is completed, and the UE 45 is located in the location registration area managed by the MME 25. Note that ISR may be implemented in the UE 45, the MME 25, the SGSN 27 and the SGW 15. Stated differently, ISR may be active in the UE 45, the MME 25 and the SGSN 27.

First, when the UE 45 detects that it has moved from the location registration area managed by the MME 25 to another location registration area, the UE 45 sends a Tracking Area Update Request message to the eNB 65 that manages the location registration area to which it has moved (S21). The UE 45 may detect that the location registration area has changed by receiving annunciation information delivered from the eNB 65. Specifically, the UE 45 may detect that the location registration area has changed when the location registration area delivered from the eNB 55 before movement and the location registration area delivered from the eNB 65 after movement are different from each other.

Next, the eNB 65 sends a Tracking Area Update Request message for the UE 45 to the MME 35 that manages the location registration area including the communication area of its own device (S23). At the same time, S1 Connection is established between the eNB 65 and the MME 35 for communication of a control message between the UE 45 and the MME 35, it is assumed that the Tracking Area Update Request message contains the identifier of the MME 25 that used to manage the location registration area from which the UE 45 has moved.

Then, the MME 35 sends a Context Request message requesting the transfer of the location registration information to the MME 25 in order to acquire the location registration information of the UE 45 from the MME 25 (S24). By the transmission of the Context Request message requesting the transfer of the location registration information from the MME 35, the MME 25 can detect that the UE 45 has moved out of the location registration area managed by itself. Further, by receiving the Context Request message sent from the from the MME 35, the MME 25 can detect that the UE 45 has moved to the location registration area managed by the MME 35.

It is assumed that a downlink data packet to the UE 45 is notified to the SGW 15 after the Context Request message is sent from the MME 35 to the MME 25 in Step S24 (S25). A downlink data packet is notified from the external network to the SGW 15 via the PGW 75.

Figure 9:
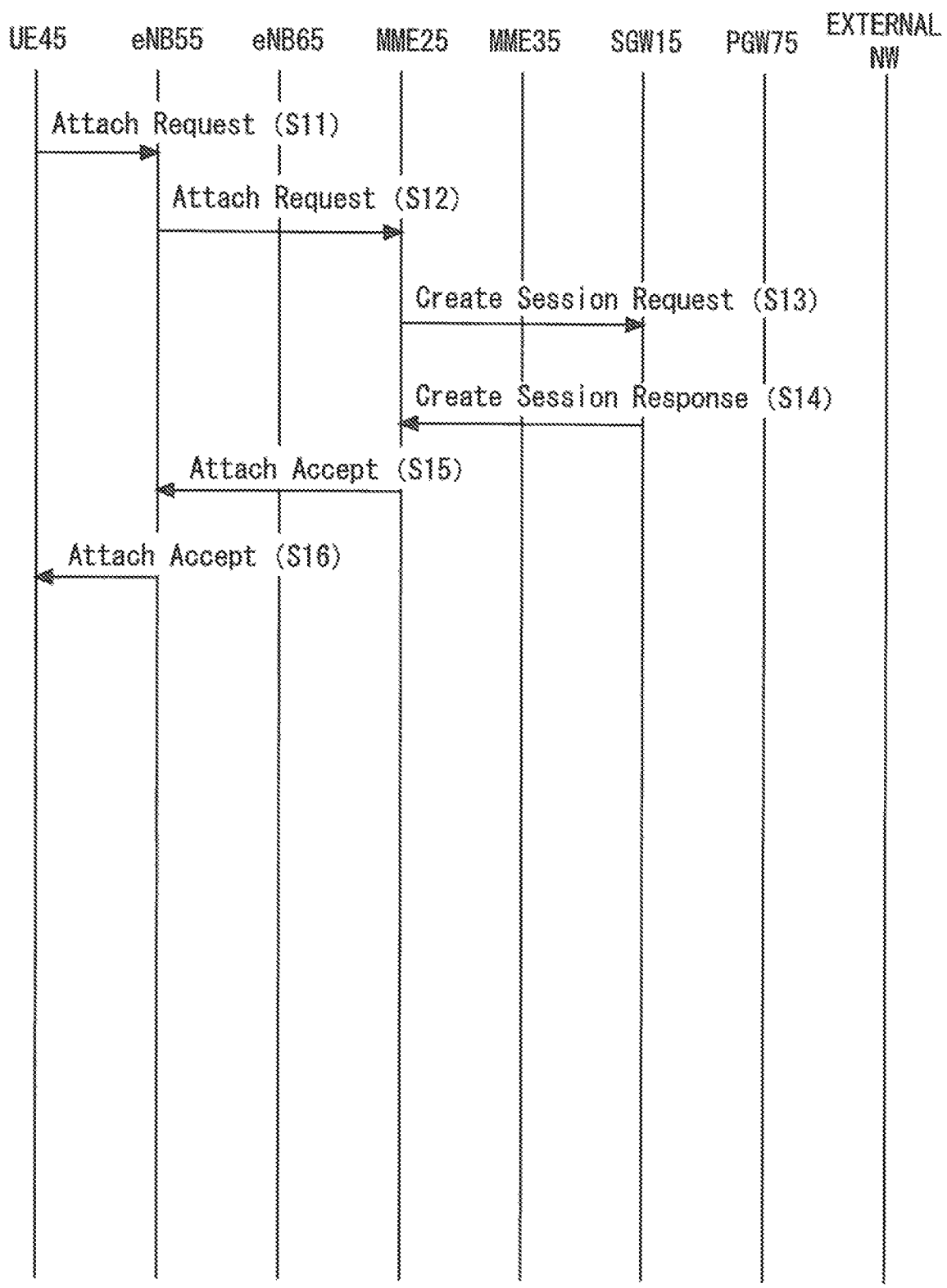
FIG. 9 is a diagram showing a flow of connection processing when connecting UE to a mobile communication system according to the second exemplary embodiment.
Figure 10:
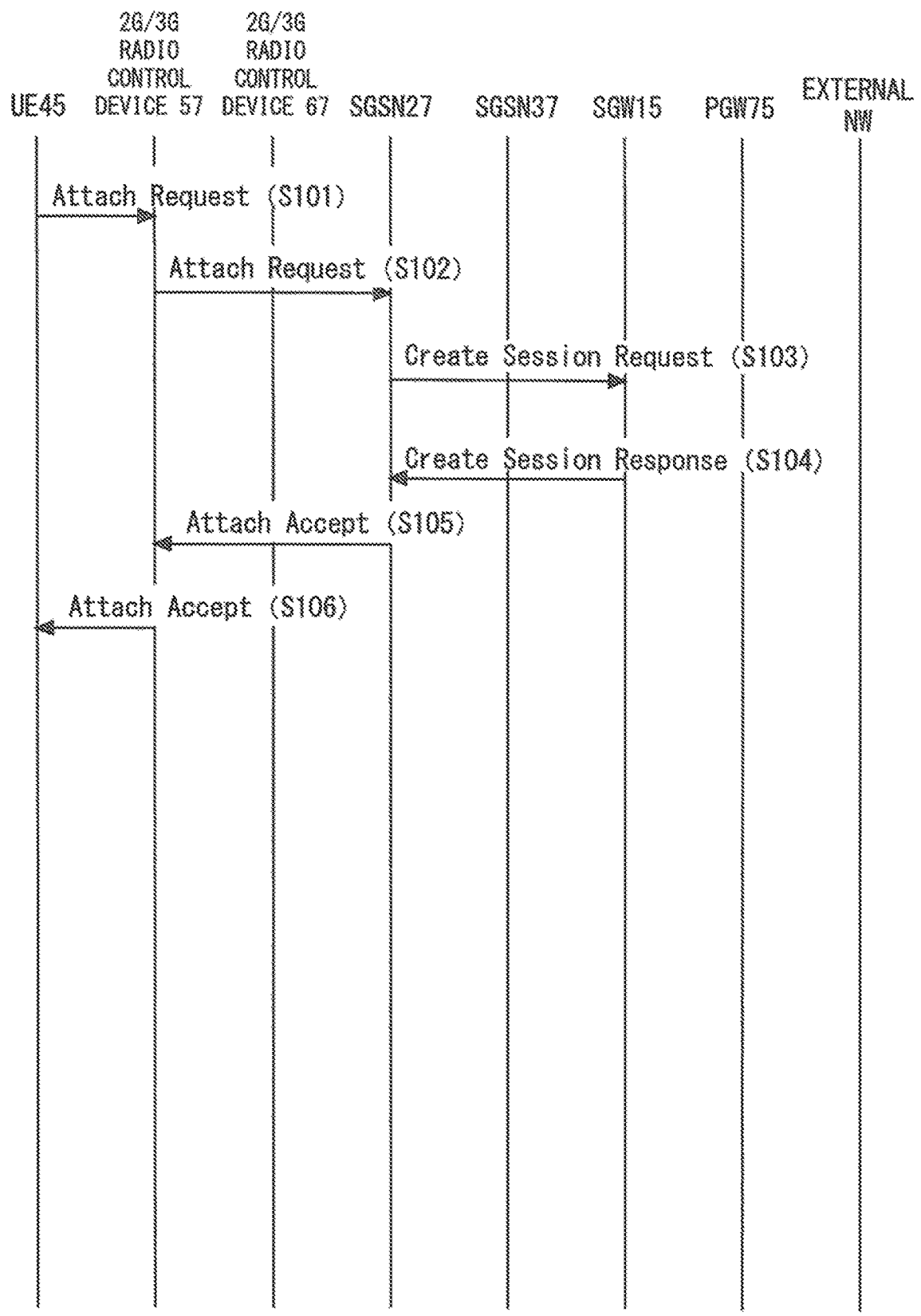
FIG. 10 is a diagram showing a flow of connection processing when connecting UE to a mobile communication system according to the second exemplary embodiment.

The SGW 15 has been notified in the connection processing in FIG. 9 that the UE 45 is located in the location registration area managed by the MME 25, Therefore, to notify a downlink data packet to the UE 45, the SGW 15 sends a Downlink Data Notification message to the MME 25 in order to notify a downlink data packet to the UE 45 (S26). Further, in the case where ISR is implemented in the UE 45, the MME 25 and the SGSN 27, the SGW 15 is notified in the connection process of FIG. 10 that the UE 45 is located in the location registration area managed by the SGSN 27. Therefore, when ISR is implemented in the UE 45, the MME 25 and the SGSN 27, the SGW 15 sends a Downlink Data Notification message to the MME 25 and the SGSN 27.

The MME 25 has detected that the UE 45 is during its movement by receiving the Context Request message in Step S24. Therefore, the MME 25 cannot temporarily perform downlink data attempt to the UE 45, that is, temporarily rejects the Downlink Data Notification message. Then, the MME 25 sets Cause indicating that the UE 45 is during its movement and downlink data attempt to the UE 45 is temporarily impossible and sends a Downlink Data Notification Acknowledge message in response to the Downlink Data Notification message (S27), To the Downlink Data Notification Acknowledge message, "Cause=Temporarily Rejected due to mobility" is set as Cause setting. "Cause=Temporarily Rejected due to mobility" indicates that information indicating that the UE is moving and downlink data attempt is temporarily unavailable (temporarily rejected) is set to Cause.

Receiving the Downlink Data Notification Acknowledge message to which "Cause=Temporarily Rejected due to mobility" is set, the SGW 15 suspends downlink data packet processing, and starts a tinier (locally configured guard timer) for resending the Downlink Data Notification message, continuing buffering of the packet addressed to the UE 45.

Then, the MME 25 executes the operation as the MME that manages the location registration area from which the UE 45 moves in the Tracking Area Update Request message. Specifically, the MME 25 sends a Context Response message to the MME 35 as a response message to the Context Request message in Step S24 (S28). The MME that manages the location registration area from which the UE 45 moves may be referred to as Old MME. On the other hand, the MME that manages the location registration area to which the UE 45 moves may be referred to as New MME. The MME 25 notifies the location registration information of the UE 45 to the MME 35 using the Context Response message. The MME 35 sends a Context Acknowledge message to the MME 25 as a response message to the Context Response message (S29).

Then, the MME 35 sends a Modify Bearer Request message to the SGW 15 in order to notify switching of the session established between the MME 25 and the SGW 15 (S30). The session established between the MME 25 and the SGW 15 is the session that has been established in Steps S13 and S14 of FIG. 9. The SGW 15 detects that the movement processing of the UE 45 is completed in the MME 35 by receiving the Modify Bearer Request message. The MME 35 may send an identifier that identifies the session established between the MME 25 and the SGW 15 to the SGW 15 and thereby notify switching of the session established between the MME 25 and the SGW 15. The identifier that identifies the session established between the MME 25 and the SGW 15 may be contained in the Context Response message in Step S28.

Further, in Step S30, the MME 35 may set information "ISR activated" indicating that ISR is active to the Modify Bearer Request message and send this message.

The SGW 15 sends a Modify Bearer Response message to the MME 35 as a response message to the Modify Bearer Request message (S31). At the same time, the SGW 15 stops the timer (locally configured guard timer) that has been started when receiving the Downlink Data Notification Acknowledge message in Step S27.

Receiving the Modify Bearer Response message, the MME 35 sends a Tracking Area Update Accept message to the eNB 65 as a response message to Step S23 (S32). Then, the eNB 65 sends the sent Tracking Area Update Accept message to the UE 45 (S33).

After that, the MME 35 releases the S1 Connection that has been established between the MME 35 and the eNB 65 (S34).

Then, the SGW 15 sends a Downlink Data Notification message to the MME 35 that manages the location registration area to which the UE 45 moves in order to notify a downlink data packet to the UE 45 (S35). Thus, in Step S35, the processing of sending the Downlink Data Notification message to the MME 25 in Step S26 is performed for the MME 35 that manages the location registration area to which the UE 45 moves. In the case where ISR is active in the MME 35 and the SGSN 27 as well, the MME 35 sends the Modify Bearer Request message to the SGW 15, and it is thereby clear that the UE 45 is located under control of the eNB 65. Thus, the SGW 15 may send the Downlink Data Notification message only to the MME 35. In other words, the SGW 15 may perform processing to resend the Downlink Data Notification message only to the MME 35. Note that, although the processing of Step 35 is described sequentially for the sake of explanation, because Step 35 is the operation of the SGW 15, it may be performed immediately after the sending in Step S31 (Modify Bearer Response). Then, the MME 35 sends a Paging message to the eNB 65 in order to perform downlink data attempt to the UE 45 (S36), and the eNB 65 performs Paging processing on the UE located in the communication area under its control (S37). In this manner, after moving to the new location registration area, the UE 45 can receive a notification about the downlink data packet that has been made during its movement.

In the case where the timer (locally configured guard timer) that has been started when the Downlink Data Notification Acknowledge message is received in Step S27 expires before receiving the Modify Bearer Request message, the SGW 15 may end the downlink data packet processing to the UE 45. Alternatively, the SGW 15 may send the Downlink Data Notification message to the MME 25 again to continue the downlink data packet processing.

In the case where the timer (locally configured guard timer) that has been started when the Downlink Data Notification Acknowledge message is received in Step S27 expires without receiving the Modify Bearer Request message, the SGW 15 may release the buffered packet addressed to the UE 45.

As described above, with use of the communication system according to the second exemplary embodiment of the invention, even when a downlink data packet is made to the UE 45 while the UE 45 is during its movement which involves a change in the MME and the movement processing of the UE 45 has not completed in the new MME, the UE 45 can normally receive a downlink data packet.

Further, when ISR is active in the MME 35, the SGSN 27 and the SGW 15, the SGW 15 performs processing to send the Downlink Data Notification message only to the MME 35, and it is thereby possible to avoid the Paging processing in the SGSN 27.

Further, in the case where the MME 25 is replaced with the SGSN 27, the MME 35 is replaced with the SGSN 37, the eNB 55 is replaced with the 2G/3G wireless control device 57, and the eNB 65 is replaced with the 2G/3G wireless control device 67 as shown in FIG. 3, the Tracking Area Update Request message in Steps S21 and S23 is replaced with the Routing Area Update Request message. Further, the Tracking Area Update Accept message in Steps S32 and S33 is replaced with the Routing Area Update Accept message. Further, S1 Connection Release in Step S34 is replaced with Iu Connection Release. Even if ISR (Idle-mode Signaling Reduction) is active in the MME 25 and the SGSN 37, the SGSN 37 sends the Modify Bearer Request message to the SGW 15, and it is thereby clear that the UE 45 is located under control of the 2G/3G wireless control device 67. Thus, the SGW 15 may perform processing to send the Downlink Data Notification message only for the SGSN 37.

Third Exemplary Embodiment

Hereinafter, a flow of processing to connect the UE to the mobile communication system according to a third exemplary embodiment of the invention is described with reference to FIG. 12. First, it is assumed that a downlink data packet to the UE 45 is notified to the SGW 15 (S41). Next, the SGW 15 sends a Downlink Data Notification message to the MME 25 (S42). Note that ISR is implemented in the UE 45, the MME 25, the SGSN 27 and the SGW 15. Thus, the SGW 15 sends the Downlink Data Notification message to the MME 25 and also sends the Downlink Data Notification message to the SGSN 27.

Then, the MME 25 sends a Downlink Data Notification Acknowledge message to the SGW 15 (S43). While the MME 25 sends the Downlink Data Notification Acknowledge message to which Cause=Temporarily Rejected due to mobility is set in FIG. 11, Cause=Temporarily Rejected due to mobility is not set in Step S43 of FIG. 12. This is because the MME 25 does not recognize the movement of the UE 45 at the point of time when the MME 25 receives the Downlink Data Notification message.

Then that, the MME 25 sends a Paging message to the eNB 55 in order to perform downlink data attempt to the UE 45 (S44), and the eNB 55 performs Paging processing on the UE located in the communication area under its control (S45).

Then, when the UE 45 detects that it has moved from the location registration area managed by the MME 25 to another location registration area, the UE 45 sends a Tracking Area Update Request message to the eNB 65 that manages the location registration area to which it has moved (S46). The UE 45 sends the Tracking Area Update Request message to the eNB 65 before completing Paging processing. Alternatively, the UE 45 sends the Tracking Area Update Request message to the eNB 65 before performing Paging processing. Because Paging processing in Step S45 and sending of the Tracking Area Update Request message in Step S46 coincide, it is assumed that sending of the Tracking Area Update Request message is done before completion of Paging processing.

Figure 11:
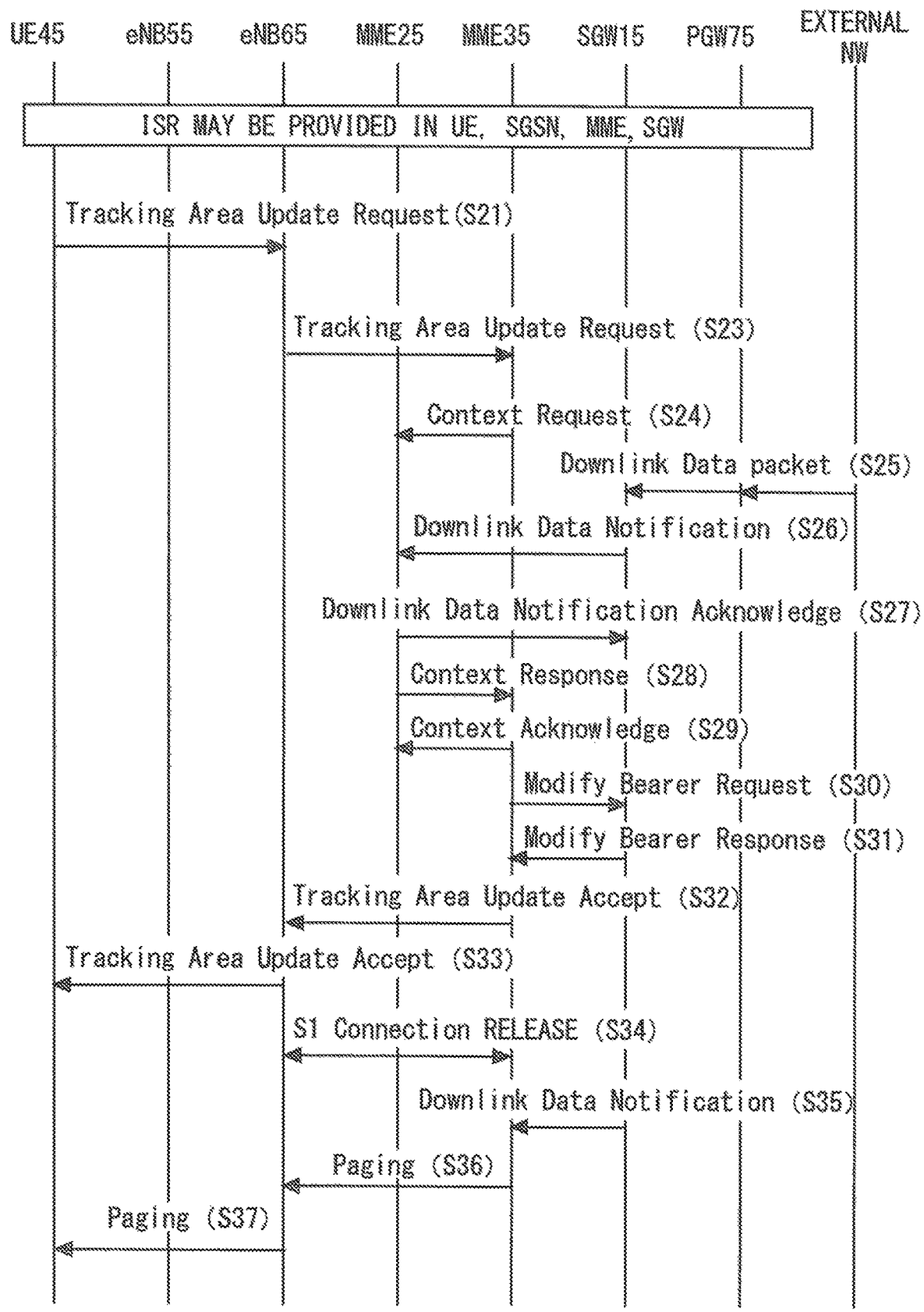
FIG. 11 is a diagram showing a flow of processing when a downlink data packet is made to UE according to the second exemplary embodiment.

The subsequent Steps S47 to S50 are the same as Steps S23, S24, S28 and S29 in FIG. 11, and therefore detailed explanation thereof is omitted.

Then, the MME 35 sends a Modify Bearer Request message to the SGW 15 in order to notify switching of the session established between the MME 25 and the SGW 15 (S51). By receiving the Modify Bearer Request message, the SGW 15 recognizes that the UE 45 has made movement that changes the location registration area.

The Steps S52 to S58 are the same as Steps S31 to S37 in FIG. 11, and therefore detailed explanation thereof is omitted. The SGW 15 recognizes that the UE 45 has made movement in Step S51 and then sends a Downlink Data Notification message to the MME 35 that manages the location registration area to which the UE 45 moves in Step S56. In this step, like Step S35 in FIG. 11, the SGW 15 resends the Downlink Data Notification message only to the MME 35. Thus, the SGW 15 does not resend the Downlink Data Notification message to the SGSN 27, even if ISR is active in the SGSN 27 and the MME 35. Note that, although the processing of Step 35 is described sequentially for the sake of explanation, because Step 35 is the operation of the SGW 15, it may be performed immediately after the sending in Step S31 (Modify Bearer Response).

In the above-described example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not restricted to the above-described exemplary embodiment, and various changes and modifications may be made without departing from the scope of the invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-258414, filed on Dec. 22, 2014, the disclosure of which is incorporated herein in its entirety by reference.

REFERENCE SIGNS LIST

10 BEARER MANAGEMENT DEVICE
11 DOWNLINK DATA CONTROL UNIT
15 SGW

16 DOWNLINK DATA CONTROL UNIT
17 DATA ACCUMULATION UNIT
20 MOBILITY MANAGEMENT DEVICE
21 LOCATION REGISTRATION AREA
25 MME
27 SGSN
30 MOBILITY MANAGEMENT DEVICE
31 LOCATION REGISTRATION AREA
35 MME
37 SGSN
40 MOBILE TERMINAL DEVICE
45 UE
46 2G/3G COMMUNICATION UNIT
47 LTE COMMUNICATION UNIT
48 PACKET COMMUNICATION UNIT
49 MOBILITY MANAGEMENT UNIT
55 eNB
57 2G/3G WIRELESS CONTROL DEVICE
65 eNB
67 2G/3G WIRELESS CONTROL DEVICE
75 PGW

The invention claimed is:

1. A mobile communication system in which an Idle-mode Signaling Reduction (ISR) is active, the mobile communication system comprising:
an User Equipment (UE);
an evolved Node B (eNB);
a Radio Network Controller (RNC);
a Mobility Management Entity (MME);
a Serving General Packet Radio Service Support Node (SGSN); and
a Serving Gateway (S-GW),
wherein when the S-GW receives a downlink data packet for the UE during a tracking area update procedure or a routing area update procedure with a change of the MME or the SGSN, while the ISR is still active, the UE is paged by the eNB or the RNC based on a paging message of only one of a new MME and a new SGSN.

2. The mobile communication system according to claim 1, wherein the S-GW is configured to send a Downlink Data Notification (DDN) message to the MME and the SGSN when the S-GW receives the downlink data packet, and to re-send the DDN message only to the new MME or the new SGSN when the S-GW receives a Modify Bearer Request message from the new MME or the new SGSN.

3. The mobile communication system according to claim 2, wherein the MME or the SGSN is configured to send a Downlink Data Notification Acknowledge (DDNA) message including a cause value indicating a temporarily rejection due to mobility procedure in response to the DDN message.

4. The mobile communication system according to claim 2, wherein the Modify Bearer Request message includes information on ISR activated.

5. A User Equipment (UE) for a mobile communication system in which an Ide-mode Signaling Reduction (ISR) is active, and an evolved Node B (eNB), a Radio Network Controller (RNC), a Mobility Management Entity (MME), a Serving General Packet Radio Service Support Node (SGSN), and a Serving Gateway (S-GW) are included, the UE comprising:
at least one processor; and
at least one memory coupled to the at least one processor, the memory storing instructions that when executed by the at least one processor cause the at least one processor to receive a paging from the eNB or the RNC, while the ISR is still active, based on a paging message of only one of a new MME and a new SGSN, when the S-GW receives a downlink data packet for the UE during a tracking area update procedure or a routing area update procedure with the change of the MME or the SGSN.

6. The UE according to claim 5, wherein the S-GW sends a Downlink Data Notification (DDN) message to the MME and the SGSN when the S-GW receives the downlink data packet, and re-sends the DDN message only to the new MME or the new SGSN when the S-GW receives a Modify Bearer Request message from the new MME or the new SGSN.

7. The UE according to claim 6, wherein the MME or the SGSN sends a Downlink Data Notification Acknowledge (DDNA) message including a cause value indicating a temporarily rejection due to mobility procedure in response to the DDN message.

8. The UE according to claim 6, wherein the Modify Bearer Request message includes information on ISR activated.

9. A communication method of a mobile communication system in which an Ide-mode Signaling Reduction (ISR) is active, and a User Equipment (UE), an evolved Node B (eNB), a Radio Network Controller (RNC), a Mobility Management Entity (MME), a Serving General Packet Radio Service Support Node (SGSN), and a Serving Gateway (S-GW) are included, the communication method comprising:
moving, by the UE, with a change of the MME or the SGSN; and
sending while the ISR is still active, by the eNB or the RNC, a paging to the UE based on a paging message of only one of a new MME and a new SGSN, based on the S-GW receiving a downlink data packet for the UE during a tracking area update procedure or a routing area update procedure with the change of the MME or the SGSN.

10. A communication method of a User Equipment (UE) for a mobile communication system in which an Ide-mode Signaling Reduction (ISR) is active, and an evolved Node B (eNB), a Radio Network Controller (RNC), a Mobility Management Entity (MME), a Serving General Packet Radio Service Support Node (SGSN), and a Serving Gateway (S-GW) are included, the communication method comprising:
moving with a change of the MME or the SGSN; and
receiving while the ISR is still active, from the eNB or the RNC, a paging based on a paging message of only one of a new MME and a new SGSN, based on the S-GW receiving a downlink data packet for the UE during a tracking area update procedure or a routing area update procedure with the change of the MME or the SGSN.

* * * * *